United States Patent
Ishii et al.

(10) Patent No.: US 7,473,867 B2
(45) Date of Patent: Jan. 6, 2009

(54) LASER MACHINING APPARATUS

(75) Inventors: Kazuhisa Ishii, Ebina (JP); Fumio Watanabe, Ebina (JP)

(73) Assignee: Hitachi Via Mechanics, Ltd., Kanagawa-ken (JP)

( * ) Notice: Subject to any disclaimer, the term of this patent is extended or adjusted under 35 U.S.C. 154(b) by 134 days.

(21) Appl. No.: 11/037,222

(22) Filed: Jan. 19, 2005

(65) Prior Publication Data

US 2005/0161445 A1  Jul. 28, 2005

(30) Foreign Application Priority Data

Jan. 20, 2004  (JP)  ............... 2004-012425

(51) Int. Cl.
*B23K 26/02* (2006.01)
*B23K 26/08* (2006.01)

(52) U.S. Cl. .................. 219/121.78; 219/121.79; 219/121.83

(58) Field of Classification Search .......... 219/121.78, 219/121.79, 121.6, 121.83
See application file for complete search history.

(56) References Cited

U.S. PATENT DOCUMENTS 4,710,604 A * 12/1987 Shirasu et al. ......... 219/121.78
5,172,356 A * 12/1992 Kibune .................. 369/44.14
5,536,916 A * 7/1996 Kohari et al. ......... 219/121.83

FOREIGN PATENT DOCUMENTS

JP  5-228673  9/1993

* cited by examiner

*Primary Examiner*—M. Alexandra Elve
(74) *Attorney, Agent, or Firm*—Wenderoth, Lind & Ponack, L.L.P.

(57) ABSTRACT

A laser machining apparatus that excels in precision in terms of machining position and shape is provided with an optical axis adjusting unit disposed on a basal optical axis of a laser beam outputted from a laser oscillator so as to adjust the laser beam outputted from the laser oscillator onto a workpiece. The laser machining apparatus is provided further with mirrors, disposed between the laser oscillator and the optical axis adjusting unit, for freely deflecting the optical axis of the laser beam. The laser machining apparatus also includes an optical axis position detecting means, disposed between the optical axis adjusting unit and the optical axis deflecting means, for detecting the position of the optical axis of the laser beam. The apparatus aligns the optical axis of the laser beam incident on the optical axis adjusting unit with the basal optical axis by means of the mirrors based on a result detected by the optical axis position detecting means.

2 Claims, 6 Drawing Sheets

LASER MACHINING APPARATUS

BACKGROUND OF THE INVENTION

1. Field of the Invention

The present invention relates to a laser machining apparatus arranged so as to adjust a laser beam emitted from a laser oscillator in X and Y directions on a workpiece by means of an optical axis adjusting unit comprising two mirrors.

2. Description of Related Art

FIG. 4 is a schematic structural view showing a conventional laser machining apparatus and FIG. 5 is a diagram schematically showing a conventional optical system.

The conventional laser machining apparatus 60 comprises a laser oscillator 1, a total reflection mirror 3, an external optical system 4, a total reflection mirror 5, an optical axis adjusting unit 6, a condenser lens (fθ lens) 8 and a table 10. A laser beam 2 emitted from the center of an opening (emitting portion) 1a of the laser oscillator 1 is led to the external optical system 4 composed of lenses and others via the total reflection mirror 3 and is irradiated to a workpiece 9 fixed on the table 10 via the optical axis adjusting unit 6 and the condenser lens (fθ lens) 8.

The optical axis adjusting unit 6 is composed of total reflection mirrors 6a and 6b disposed at positions where their axes of rotation are twisted from each other and scanner motors 6c and 6d for turning the total reflection mirrors 6a and 6b. The table 10 is constructed so as to be movable in X and Y directions (in the lateral direction and in the direction perpendicular to the face of the drawing). Thereby, the laser beam 2 may be adjusted to a target position of the workpiece 9 by turning the total reflection mirrors 6a and 6b. It is noted that optically, the optical axis adjusting unit 6 is constructed so as to reduce and form an image that has been formed behind the external optical system 4 at a machining spot by using the condenser lens 8.

By the way, there is a case when the laser beam 2 does not pass through a deflecting point of the condenser lens 8 depending on a turning angle of the total reflection mirror 6a. Due to that, Japanese Patent Laid-Open No. 1993-228673 has proposed one in which a total reflection mirror is disposed between the laser oscillator 1 and the total reflection mirror 6a to adjust an incident position of the laser beam 2 on the total reflection mirror 6a so that the laser beam 2 passes through the deflecting point of the condenser lens 8 by moving the total reflection mirror while keeping the angle thereof with the incident light.

FIG. 6 is a plan view diagrammatically showing the opening 1a of the laser oscillator 1. The optical system composed of lenses and mirrors within the laser oscillator 1 shapes an outline and regulates an angle of divergence of the laser beam 2 formed in an oscillator source within the laser oscillator 1 so that its optical axis coincides with the center Q of the opening 1a of the laser oscillator 1 as shown in FIG. 6 and becomes perpendicular to the opening 1a that is parallel with the face of the drawing. However, because there is a case when the temperature of the lenses and mirrors disposed within the laser oscillator 1 increases, thus causing thermal deformation, when the laser beam passes through them, there is a case when the position of the optical axis in the opening 1a moves to a point Q1 for example deviating from the center Q or when the optical axis is not perpendicular to the opening 1a. Still more, the position of the optical axis in the opening 1a may deviate from the center Q or the optical axis may not become perpendicular to the opening when oscillating frequency or output of the laser oscillator 1 is changed. The deviation from the center Q of the optical axis and its deviating direction as well as an angle of output thereof at the opening 1a also vary depending on use conditions and are not uniform.

The conventional laser machining apparatus described above which is arranged so that the laser beam passes through the deflecting point of the condenser lens 8 by means of the total reflection mirror allows machining to be carried out at high precision as long as the optical axis of the laser beam incident on the total reflection mirror does not vary. However, when the optical axis of the laser beam deviates or its output angle varies, the precision in adjusting the laser beam 2 to the target position drops and hence the precision in machining position drops. Moreover, the image formed behind the external optical system 4 distorts or becomes defective, thus dropping the precision in shape of the spot to be machined.

It is therefore an object of the invention to provide a laser machining apparatus that solves the above-mentioned problems by enabling an optical axis of a laser beam to be adjusted with a predetermined optical axis.

SUMMARY OF THE INVENTION

According to a first aspect of the invention, a laser machining apparatus having an optical axis adjusting unit disposed on a predetermined optical axis of a laser beam outputted from a laser oscillator so as to adjust the laser beam outputted from the laser oscillator onto a workpiece is provided further with:

optical axis deflecting means, disposed between the laser oscillator and the optical axis adjusting unit, for freely deflecting the optical axis of the laser beam; and optical axis position detecting means, disposed between the optical axis adjusting unit and the optical axis deflecting means, for detecting the position of the optical axis of the laser beam: and the optical axis deflecting means adjusts the optical axis of the laser beam incident on the optical axis adjusting unit with the predetermined optical axis based on the result detected by the optical axis position detecting means.

Preferably, the optical axis adjusting unit is composed of two mirrors which are rotatable around the axes, which are disposed so that their axes are perpendicular to a plane containing the predetermined optical axis inputted to and reflected from the mirrors and so that their axes are twisted from each other, and which are movable in the direction of the predetermined optical axis inputted to or reflected from the mirrors.

More preferably, the optical axis position detecting means is disposed so as to be able to detect the optical axis of the laser beam at two different points.

According to the invention described above, because the optical axis of the laser beam incident on the optical axis adjusting unit is stabilized even when the optical axis of the laser beam deviates or inclines due to machining conditions that may be changed corresponding to an elapse of machining time, a material quality of the workpiece or boring size, a uniform machining quality may be obtained in terms of machining position and precision in shape of a machined portion.

Additional objects and advantages of the invention will be apparent from the following detailed description of a preferred embodiment thereof, which are best understood with reference to the accompanying drawings.

BRIEF DESCRIPTION OF THE DRAWINGS

FIGS. 2A and 2B are diagrams for explaining operations of a mirror, wherein FIG. 2A shows a case when the mirror is moved in the Z direction and FIG. 2B shows a case when the mirror is turned in the direction of u';

DETAILED DESCRIPTION OF THE INVENTION

Figure 1:
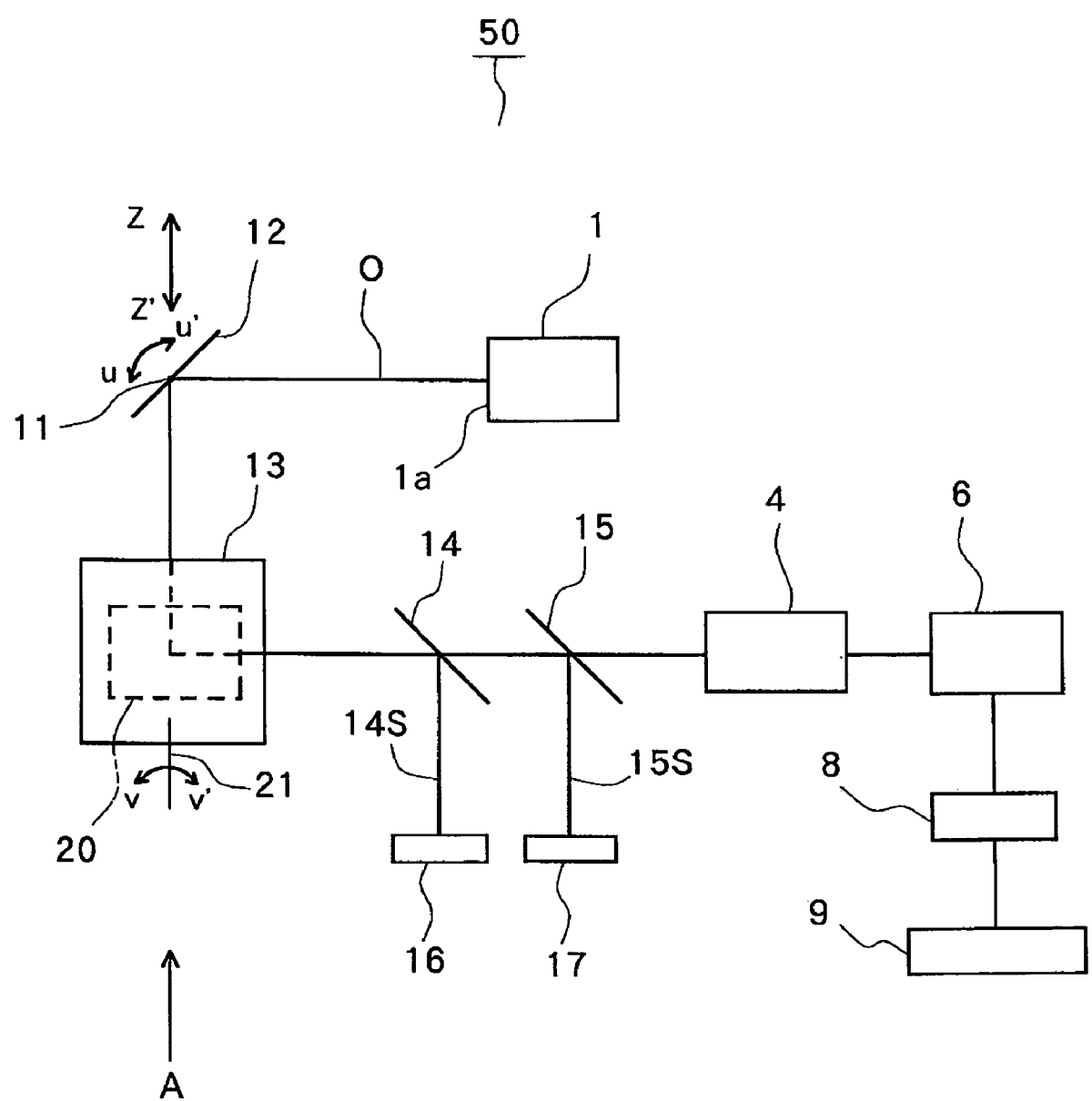
FIG. 1 is a schematic diagram for explaining an optical system of the present invention.
Figure 2A:
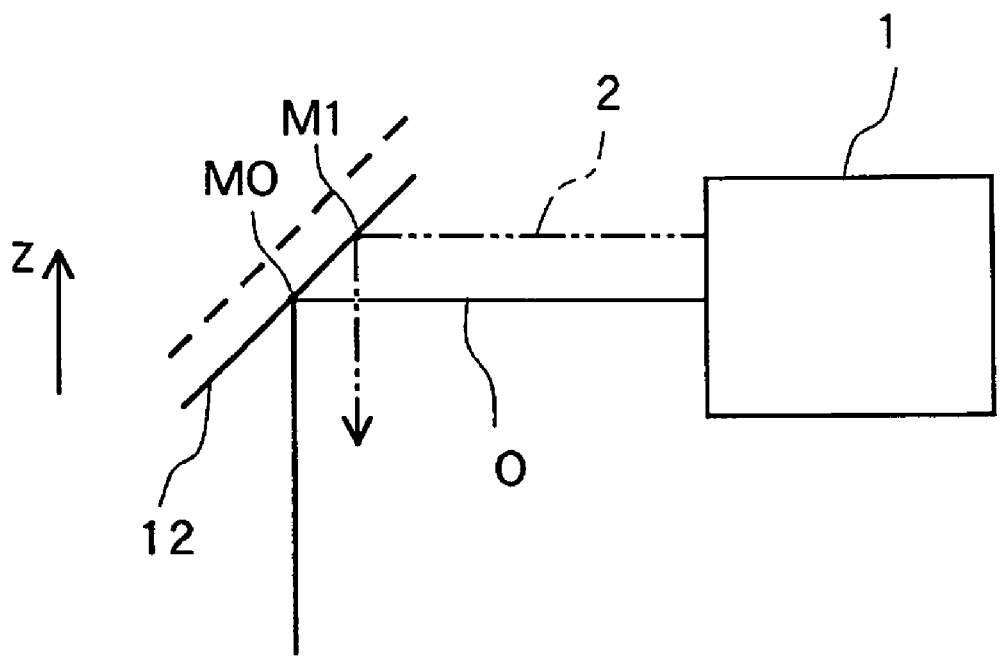
Figure 2B:
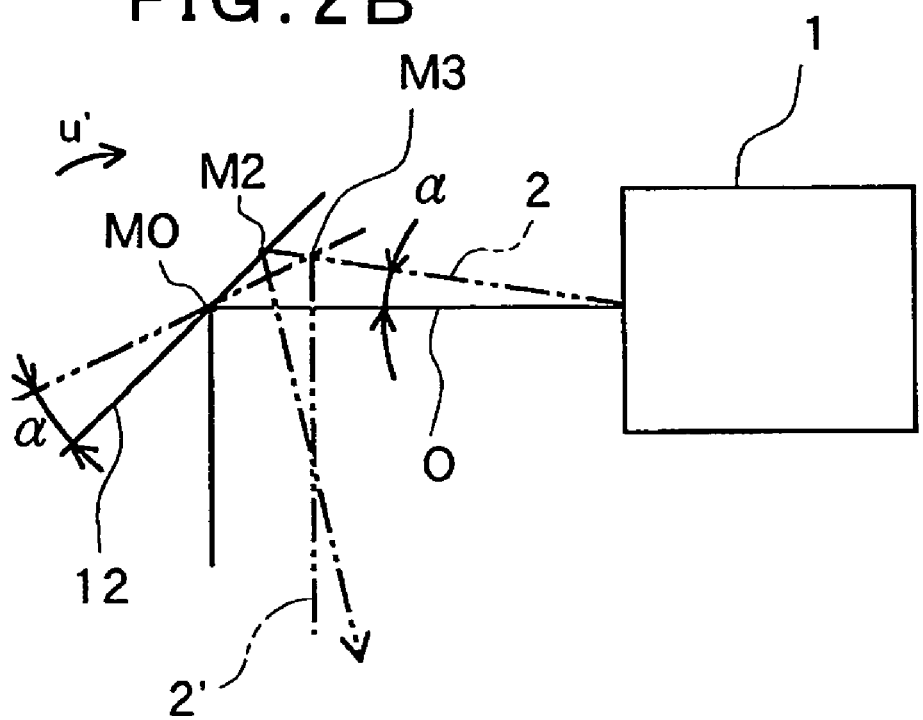
Figure 3:
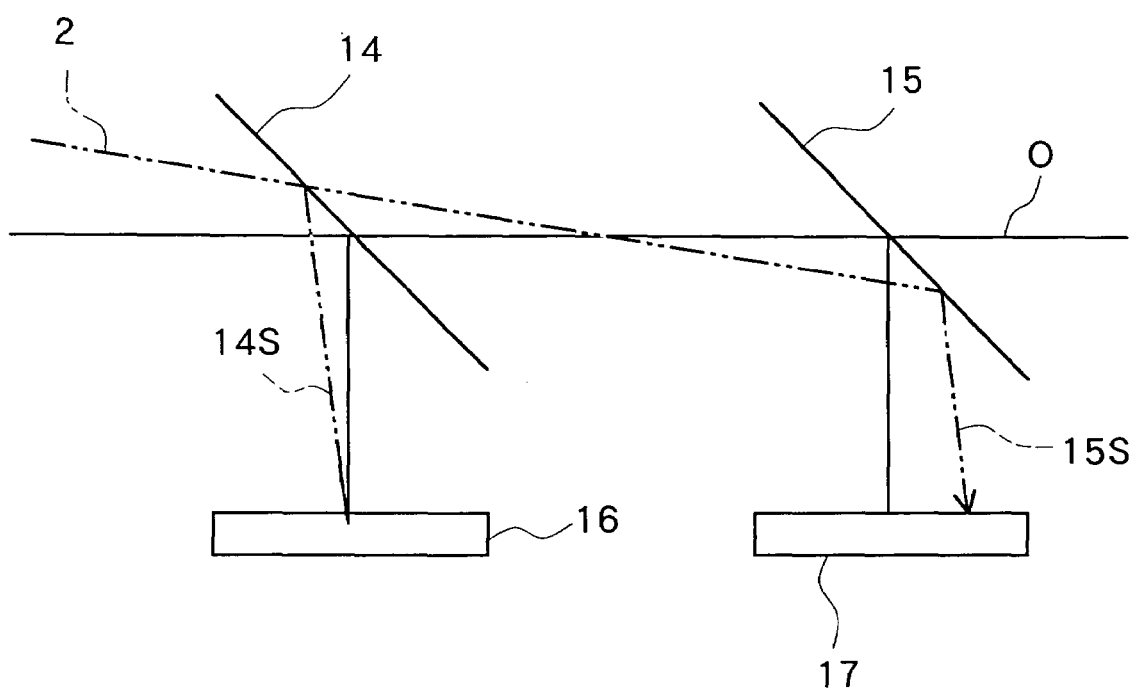
FIG. 3 is a diagram for explaining operations of photo-detectors.
Figure 4:
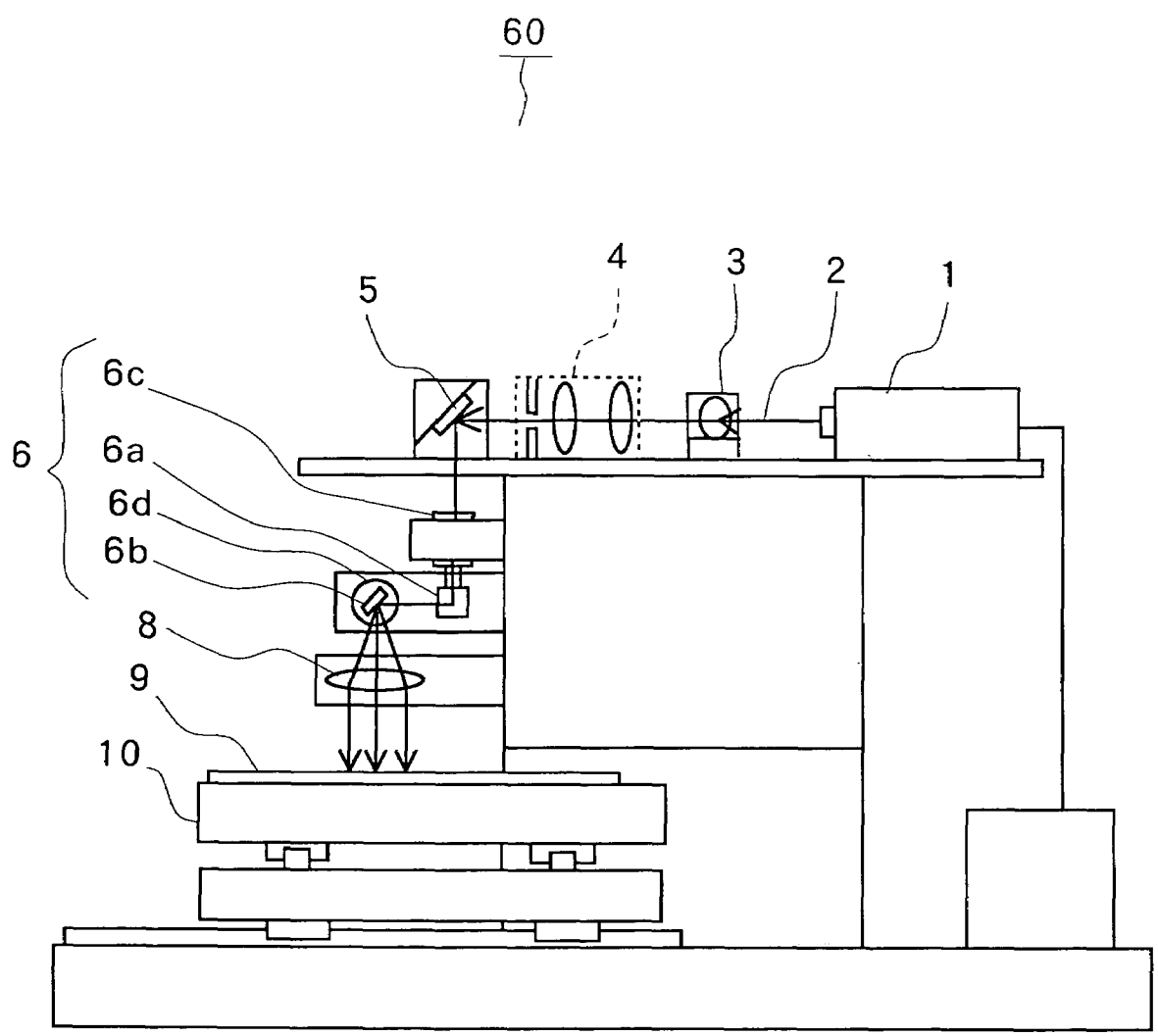
FIG. 4 is a schematic diagram showing a structure of a conventional laser machining apparatus.
Figure 5:
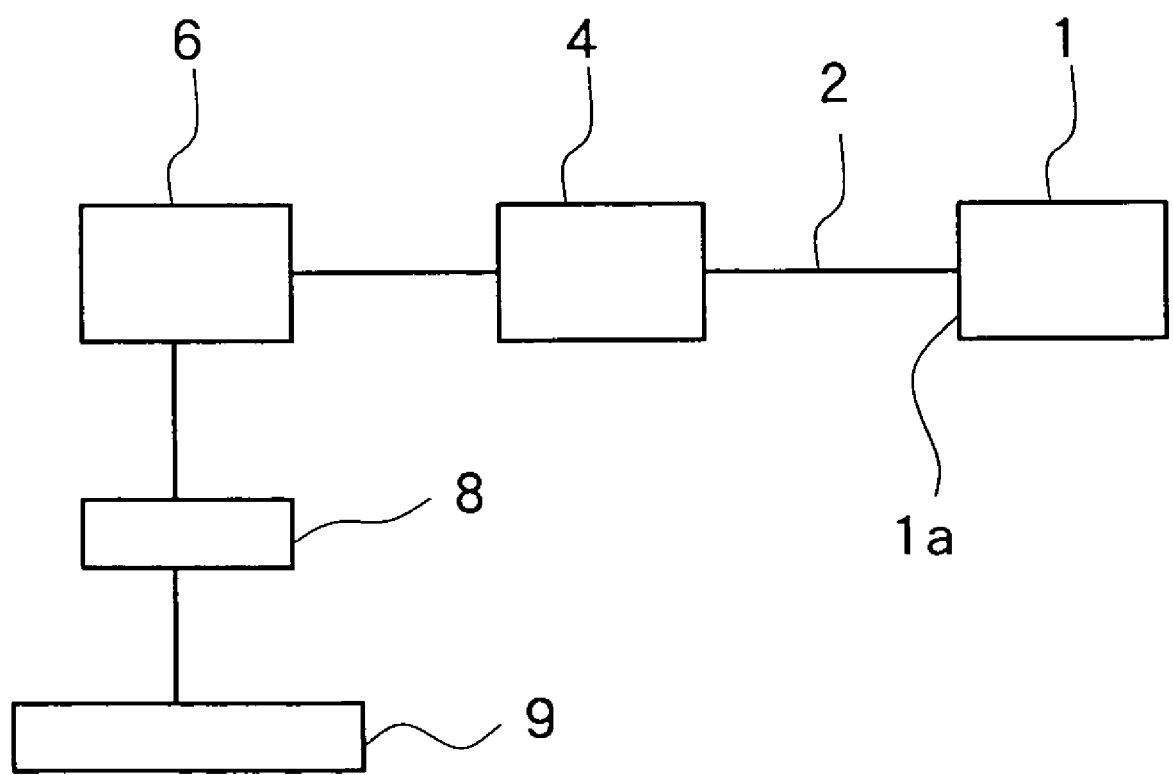
FIG. 5 is a diagram schematically showing a conventional optical system.
Figure 6:
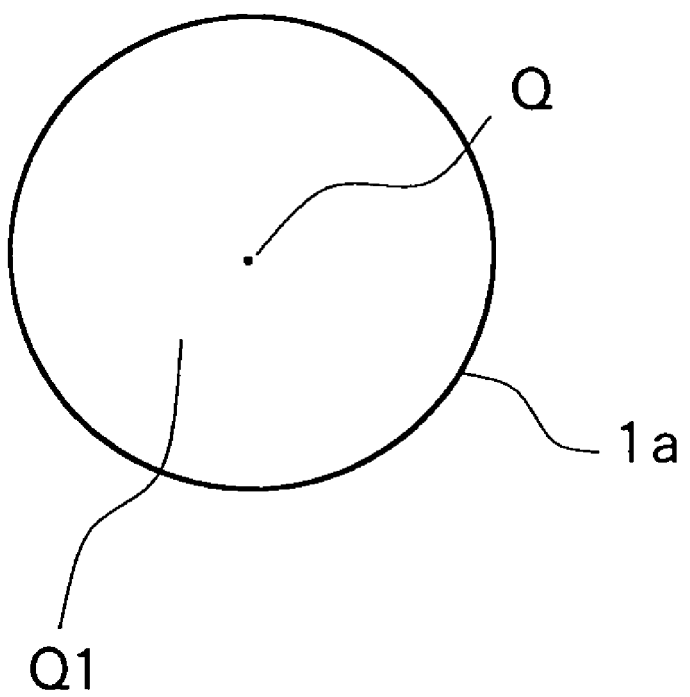
FIG. 6 is a plan view schematically showing an emitting portion of a laser oscillator.

A preferred embodiment of the invention will be explained with reference to FIGS. 1 through 3. FIG. 1 is a schematic diagram for explaining an optical system of the invention, FIGS. 2A and 2B are diagrams for explaining operations of a mirror 12, wherein FIG. 2A shows a case when the mirror 12 is moved in the Z direction and FIG. 2B shows a case when the mirror 12 is turned in the direction of u', and FIG. 3 is a diagram for explaining operations of photo-detectors. It is noted that the same parts or parts having the same function with those in FIG. 4 are denoted by the same reference numerals and an overlapped explanation thereof will be omitted here.

The mirror (optical axis deflecting means) 12 has an axis 11 perpendicular to an incident direction and reflecting direction of a laser beam, i.e., in the direction perpendicular to the face of the drawing. The mirror 12 is turnable in the direction of an arrow u-u' around the axis 11, and is movable in the direction of an arrow Z-Z' perpendicular to a basal optical axis O, i.e., in the vertical direction (or in the lateral direction) in the drawing, by a moving unit (not shown). That is, the axis 11 of the mirror 12 is disposed perpendicularly to a plane containing the basal optical axis O inputted to and reflected from the mirror 12 and is movable in the direction of the basal optical axis O reflected (or in the direction inputted) by the mirror 12. It is noted that the basal optical axis O is a central axis of the laser beam vertically outputted from a center Q of an opening 1a of a laser oscillator 1. Still more, a reference angle of the mirror 12 with respect to the basal optical axis O is 45°. Further, the axis 11 of the mirror 12 is disposed at a position where it is angled relative to an axis 21 of a mirror 20 (described later)

Thereby, it becomes possible to align the optical axis of the laser beam 2 with the basal optical axis O in one of the X and Y-axes on the surface of a workpiece 9 by turning the mirror 12 in the direction of the arrow u-u' and by moving it in the Z-axis direction, i.e., in the direction of the arrow Z-Z'.

A total reflection mirror 13 deflects the basal optical axis O that has been deflected by the mirror 12 (a deflector) in the direction perpendicular to the face of the drawing to the rear side thereof.

The mirror (optical axis deflecting means) 20 (a deflector) has the axis 21 perpendicular to the incident direction and reflecting direction of the laser beam deflected by the total reflection mirror 13, i.e., in the vertical direction in parallel to the face of the drawing. The mirror 20 is turnable in the direction of an arrow v-v' around the axis 21, and is movable in the direction perpendicular to the face of the drawing (or in the vertical direction in the drawing) by a moving unit (not shown). That is, the axis 21 of the mirror 20 is disposed perpendicular to a plane containing the basal optical axis O inputted to and reflected from the mirror 12 and is movable in the direction of the basal optical axis O reflected (or in the direction inputted) by the mirror 20. It is noted that the mutual relationship between the mirror 20 and the axis 21 as seen from the direction of A in the figure is the same as that of the mirror 12 and the axis 11, and a reference angle of the mirror 20 with respect to the basal optical axis O is also 45°. Still more, the axis 21 of the mirror 20 is disposed at the position such that it is angled relative to the axis 11 of the mirror 12 described above.

An optical axis position detecting means is composed of first and second beam splitters 14 and 15 and photo-detectors 16 and 17. The first and second beam splitters 14 and 15 are disposed aslant by 45° with respect to the basal optical axis O and reflect 1% of the incident laser beam 2 as beams-to-be-detected 14S and 15S, while transmitting the remainder. The photo-detectors 16 and 17 are disposed on the reflecting side of the beam splitters 14 and 15. A large number of small light receiving elements whose center to be detected is positioned on an extension line of the basal optical axis O are disposed on the surface of the photo-detectors 16 and 17 in the direction of a plane perpendicular to the beams-to-be-detected 14S and 15S (when the laser beam is aligned with the basal optical axis O).

It is noted that an external optical system 4 is disposed so that its axial line is coaxial with the basal optical axis O and a total reflection mirror 6a of an optical axis adjusting unit 6 is disposed so that its axis of rotation is perpendicular to the basal optical axis O.

Next, an operation of the invention will be explained.

There are three kinds of cases when the optical axis of the laser beam 2 is not aligned with basal optical axis O, i.e., when the optical axis deviates in parallel from the basal optical axis O, when the optical axis inclines from the basal optical axis O and when the optical axis deviates in parallel and inclines from the basal optical axis O. The operation of the apparatus in those cases will be explained below in order.

Case 1: When the optical axis of the laser beam 2 deviates from the basal optical axis O in parallel in the Z-axis direction:

When the laser beam 2 deviates in parallel to a position indicated by a two-dotted chain line for example as shown in FIG. 2A, the laser beam 2 enters the mirror 12 at point M1. In this case, it is possible to align the optical axis of the laser beam 2 with the basal optical axis O by moving the mirror 12 in the direction of the arrow Z to a position indicated by a dotted line in the figure.

Case 2: When the optical axis of the laser beam 2 inclines from the basal optical axis O by an angle α:

When the laser beam 2 inclines by the angle α to a position indicated by a two-dotted chain line for example as shown in FIG. 2B, the laser beam 2 enters the mirror 12 at point M2. In this case, it is possible to adjust the optical axis in parallel with the basal optical axis as indicated by a laser beam 2' by inclining the mirror 12 by the angle α to a position indicated by a two-dotted chain line in the figure. It is then possible to align the optical axis of the laser beam 2 with the basal optical axis O by moving the mirror 12 upward in the figure, i.e., in the direction of the arrow Z, in this state as explained above in Case 1.

Case 3: When the optical axis of the laser beam 2 deviates in parallel and inclines from the basal optical axis O:

Because this is a case when the two Cases 1 and 2 described above are combined, it is possible to align the optical axis of the laser beam 2 with the basal optical axis O by changing the angle of the mirror 12 and by moving the position of the mirror 12.

Because the mirror 13 reflects the optical axis, it is possible to align the optical axis of the laser beam 2 with the basal optical axis O also in the other direction of the X and Y axes on the surface of the workpiece 9 from the basal optical axis O from the laser oscillator 1 similarly to the mirror 12 by turning the mirror 20 in the direction of the arrow v-v' and by moving it in the direction perpendicular to the face of the drawing.

It is noted that the angles and distances to be moved of the mirrors 12 and 20 may be found by calculating the deviation of the centers of the beams to be detected 14S and 15S from the centers of the photo-detectors 16 and 17.

Here, the necessity of providing the two photo-detectors will be explained.

In general, the photo-detectors 16 and 17 are unable to discriminate an incidence angle of an incident beam. Therefore, there may be a case when the beam to be detected 14S split from the laser beam inclining from the basal optical axis O enters the photo-detector 16 at the center thereof like the optical axis of the beam to be detected 14S shown in FIG. 3. However, the optical axis of the beam to be detected 15S deviates from the center of the photo-detector 17 as shown in the figure.

That is, the optical axis of the laser beam 2 coincides with the basal optical axis O when the turning angles and the positions of the mirrors 12 and 20 can be set so that the optical axes of the beams to be detected 14S and 15S enter the center of the photo-detectors 16 and 17, respectively.

It is noted that when the optical axis of the laser beam 2 coincides with the basal optical axis O, the beams to be detected 14S and 15S enter the centers of the photo-detectors 16 and 17. Accordingly, it is not necessary to move the mirrors 12 and 20.

While the two beam splitters and two photo-detectors have been provided in the present embodiment, it is possible to provide one each and to arrange them so as to detect the optical axis of the laser beam at the two points of the beam splitters 14 and 15 in FIG. 1 by means of a moving device for moving them in the direction of the basal optical axis O.

Still more, although the mirrors 12 and 20 have been arranged so as to be turnable on the axis of rotation of the mirrors 12 and 20 in the present embodiment, they may be fixed when the inclination of the laser beam 2 from the basal optical axis O is very small. In such a case, it is possible to provide one each beam splitter and photo-detector and to fix them.

Although the present embodiment has been explained by exemplifying the laser machining apparatus 50 for machining a workpiece in plane, the invention is applicable not only to that but also to a laser machining apparatus for machining a workpiece in solid for example.

It will be obvious to those having skill in the art that many changes may be made in the above-described details of the preferred embodiment of the invention. The scope of the invention, therefore, should be determined by the following claims.

What is claimed is:

1. A laser machining apparatus comprising:
   an optical axis adjusting unit disposed on a predetermined optical axis of a laser beam outputted from a laser oscillator so as to adjust the laser beam outputted from said laser oscillator onto a workpiece;
   an optical axis deflecting means for freely deflecting an optical axis of the laser beam, said optical axis deflecting means being arranged between said laser oscillator and said optical axis adjusting unit;
   an optical axis position detecting unit for detecting a position of the optical axis of the laser beam, said optical axis position detecting unit being disposed on the predetermined optical axis and between said optical axis adjusting unit and said optical axis deflecting means, said optical axis position detecting unit including first and second photo-detectors for detecting a position of the optical axis of the laser beam at two different points, respectively,
   wherein said optical axis deflecting means is operable to adjust the optical axis of the laser beam incident on said optical axis adjusting unit so as to be aligned with the predetermined optical axis based on a result detected by said optical axis position detecting unit,
   wherein said optical axis deflecting means includes two mirrors which are rotatable around respective axes, said mirrors being arranged such that the predetermined optical axis is inputted to and reflected by said mirrors,
   wherein said mirrors are disposed so that said axes are perpendicular to input directions of the predetermined optical axis inputted to said mirrors, respectively, so that said axes are perpendicular to directions in which the predetermined optical axis is reflected by said mirrors, respectively, and so that said axes are perpendicular to each other; and
   a moving unit for moving said mirrors at said axes in the input directions of the predetermined optical axis inputted to said mirrors or in the directions in which the predetermined optical axis is reflected by said mirrors, respectively in response to the optical axis of the laser beam being misaligned with and parallel to the predetermined optical axis so as to align the optical axis of the laser beam with the predetermined optical axis.

2. The laser machining apparatus according to claim 1, wherein said optical axis position detecting unit further includes first and second beam splitters disposed at the two different points along the predetermined optical axis so as to split the laser beam at each of the two points such that said first and second photo-detectors receive the split laser beams from said first and second beam splitters, respectively.

* * * * *